US012688768B2

(12) United States Patent
Wu et al.

(10) Patent No.: US 12,688,768 B2
(45) Date of Patent: Jul. 21, 2026

(54) SYSTEM FOR CONTEXTUALLY DRIVEN, PERSONALIZED, IN-TIME UTILITY FOR WEARABLE ELECTRONIC DEVICES

(71) Applicant: Google LLC, Mountain View, CA (US)

(72) Inventors: Shengzhi Wu, Shenzhen (CN); Diane C. Wang, San Francisco, CA (US); Michael Ishigaki, Mountain View, CA (US); Elena Jessop Nattinger, San Carlos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/289,640

(22) PCT Filed: Dec. 15, 2021

(86) PCT No.: PCT/US2021/063535
§ 371 (c)(1),
(2) Date: Nov. 6, 2023

(87) PCT Pub. No.: WO2023/018435
PCT Pub. Date: Feb. 16, 2023

(65) Prior Publication Data
US 2024/0242591 A1      Jul. 18, 2024

Related U.S. Application Data

(60) Provisional application No. 63/232,371, filed on Aug. 12, 2021.

(51) Int. Cl.
*G08B 21/24* (2006.01)
*G06F 1/16* (2006.01)
(Continued)

(52) U.S. Cl.
CPC ............ *G08B 21/24* (2013.01); *G06F 1/163* (2013.01); *G06F 11/3438* (2013.01); *H04W 76/14* (2018.02)

(58) Field of Classification Search
None
See application file for complete search history.

(56) References Cited

U.S. PATENT DOCUMENTS

| | | | | |
|---|---|---|---|---|
| 8,416,744 B2* | 4/2013 | Becker | ................. | H04W 60/04 |
| | | | | 370/328 |
| 8,941,500 B1* | 1/2015 | Faaborg | ................ | G08B 21/18 |
| | | | | 340/539.11 |

(Continued)

FOREIGN PATENT DOCUMENTS

| | | |
|---|---|---|
| WO | 2016189372 A2 | 12/2016 |
| WO | 2018209152 A1 | 11/2018 |
| WO | 2020198088 A1 | 10/2020 |

OTHER PUBLICATIONS

International Search Report and Written Opinion for International Application No. PCT/US2021/063535 dated May 3, 2022. 12 pages.

(Continued)

*Primary Examiner* — Muhammad Adnan
(74) *Attorney, Agent, or Firm* — Lerner David LLP

(57) ABSTRACT

The present disclosure provides for Contextual Alerting Functions (CAFs). CAFs are an interface paradigm for synchronized device frameworks across multi-device ecosystems and user data models. CAFs replace existing concepts such as apps and/or notifications.

20 Claims, 7 Drawing Sheets

(51) Int. Cl.
  *G06F 11/34*    (2006.01)
  *H04W 76/14*    (2018.01)

(56)    References Cited

U.S. PATENT DOCUMENTS

| | | | | |
|---|---|---|---|---|
| 8,983,551 | B2 * | 3/2015 | Worick | H04M 19/041 |
| | | | | 455/567 |
| 9,224,293 | B2 * | 12/2015 | Taylor | G08G 1/0116 |
| 9,622,180 | B1 * | 4/2017 | Yeung | H04M 1/72412 |
| 9,622,214 | B2 * | 4/2017 | Ryu | H04M 19/04 |
| 9,646,473 | B2 * | 5/2017 | Ros | G08B 15/004 |
| 9,729,998 | B2 * | 8/2017 | Kreitzer | H04B 1/385 |
| 10,037,689 | B2 * | 7/2018 | Taylor | G05D 1/0285 |
| 10,562,495 | B2 * | 2/2020 | Kristinsson | B60Q 1/482 |
| 10,613,494 | B2 * | 4/2020 | Gao | H04L 12/2823 |
| 10,679,482 | B2 * | 6/2020 | Myers | G16H 40/67 |
| 10,680,997 | B2 * | 6/2020 | Ledwith | H04L 67/06 |
| 10,757,755 | B2 * | 8/2020 | Wu | H04M 1/72412 |
| 11,056,238 | B1 * | 7/2021 | Nakajima | G16H 50/30 |
| 11,194,463 | B2 * | 12/2021 | D'Souza | G06F 1/163 |
| 11,868,599 | B2 * | 1/2024 | Conlon | G06Q 50/265 |
| 12,300,084 | B2 * | 5/2025 | Rogers | G08B 21/22 |
| 2010/0265866 | A1 * | 10/2010 | Chao | H04W 72/30 |
| | | | | 370/312 |
| 2013/0040610 | A1 * | 2/2013 | Migicovsky | H04M 1/724095 |
| | | | | 455/418 |
| 2014/0273986 | A1 * | 9/2014 | Luna | H04W 4/38 |
| | | | | 455/414.1 |
| 2015/0223705 | A1 * | 8/2015 | Sadhu | A61B 5/0006 |
| | | | | 600/595 |
| 2015/0230022 | A1 * | 8/2015 | Sakai | H04R 1/1041 |
| | | | | 381/58 |
| 2015/0324078 | A1 * | 11/2015 | Dipin | G06F 3/0482 |
| | | | | 715/765 |
| 2015/0341902 | A1 * | 11/2015 | Ryu | H04W 68/02 |
| | | | | 455/458 |
| 2016/0132046 | A1 | 5/2016 | Beoughter et al. | |
| 2016/0246492 | A1 * | 8/2016 | Baldassari | H04M 1/72484 |
| 2016/0291802 | A1 * | 10/2016 | Beck | G06F 3/0481 |
| 2016/0330711 | A1 * | 11/2016 | Thorson | H04W 68/005 |
| 2017/0004685 | A1 * | 1/2017 | Karsten | G06F 3/04883 |
| 2017/0078837 | A1 * | 3/2017 | Liang | H04L 67/52 |
| 2017/0112452 | A1 * | 4/2017 | Otto | A61B 5/7221 |
| 2017/0124853 | A1 * | 5/2017 | Mehta | G08B 25/009 |
| 2017/0273050 | A1 * | 9/2017 | Levak | G06F 1/163 |
| 2017/0311903 | A1 | 11/2017 | Davis et al. | |
| 2017/0339663 | A1 * | 11/2017 | Peterson | H04M 1/724 |
| 2017/0345283 | A1 * | 11/2017 | Kwon | H04L 12/2825 |
| 2017/0374523 | A1 * | 12/2017 | Wong | H04M 1/72412 |
| 2018/0084073 | A1 * | 3/2018 | Walsh | H04L 67/12 |
| 2018/0286150 | A1 * | 10/2018 | Chen | G07C 5/008 |
| 2018/0359349 | A1 * | 12/2018 | Graylin | G10L 15/1815 |
| 2019/0042280 | A1 * | 2/2019 | Shanbhogue | G06F 1/3206 |
| 2019/0089796 | A1 | 3/2019 | Lewallen, Jr. et al. | |
| 2019/0138177 | A1 * | 5/2019 | D'souza | G06F 1/1626 |
| 2020/0053509 | A1 * | 2/2020 | Wong | H04W 4/80 |
| 2020/0336585 | A1 * | 10/2020 | Bhullar | G06Q 10/10 |
| 2021/0176595 | A1 * | 6/2021 | Wong | H04M 1/72412 |
| 2021/0374885 | A1 * | 12/2021 | Musk | G06Q 20/40155 |
| 2021/0377204 | A1 * | 12/2021 | Sachidanandam | G06F 1/163 |
| 2022/0027828 | A1 * | 1/2022 | Avala | G06Q 10/06393 |
| 2022/0240843 | A1 * | 8/2022 | Kokoszka | G16H 50/70 |
| 2024/0378973 | A1 * | 11/2024 | Brayton | H04H 20/71 |
| 2025/0217262 | A1 * | 7/2025 | Nichter | G06F 11/0793 |

OTHER PUBLICATIONS

International Preliminary Report on Patentability for International Application No. PCT/US2021/063535 dated Feb. 22, 2024. 7 pages.

* cited by examiner

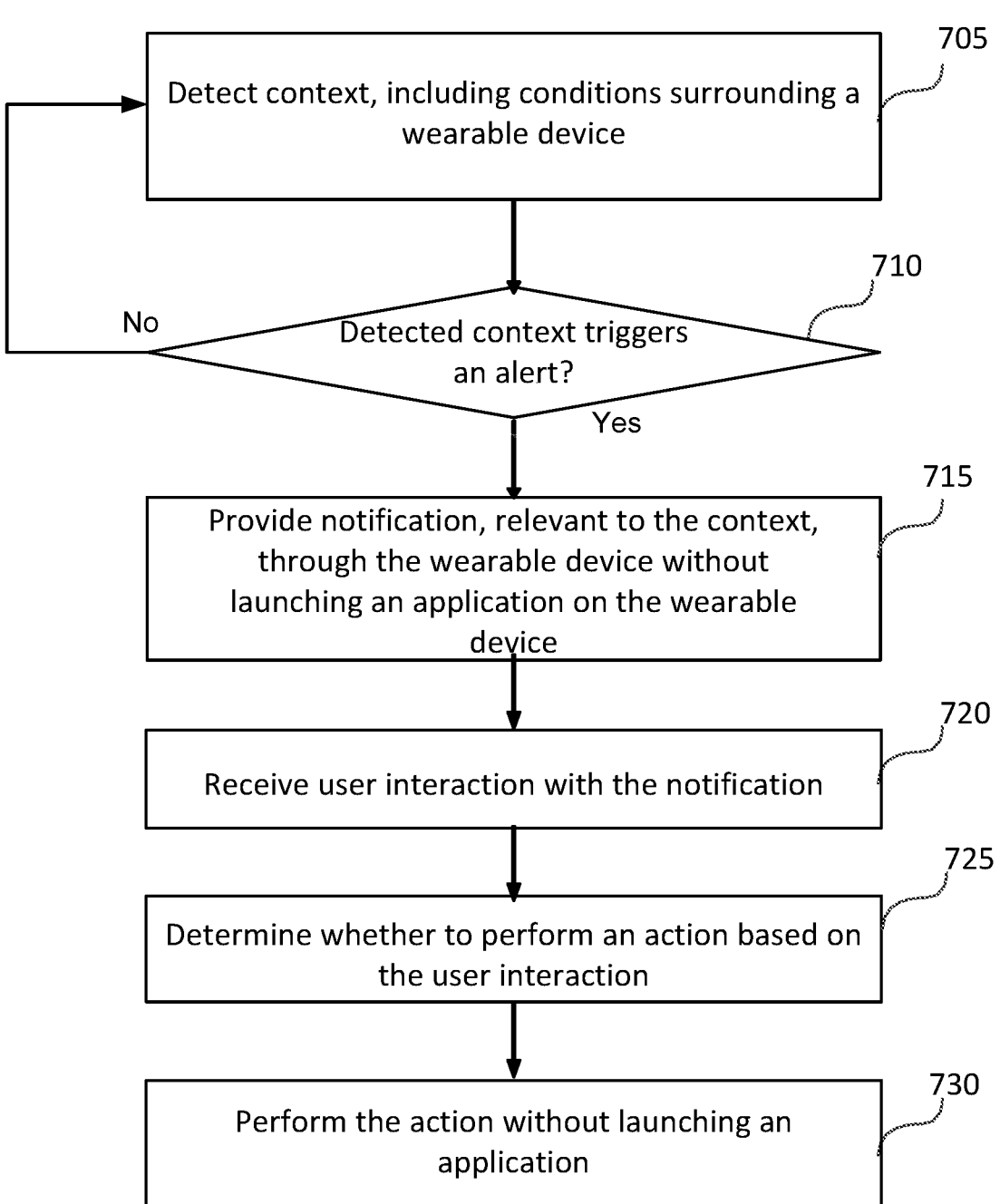

705

Detect context, including conditions surrounding a wearable device

710

No     Detected context triggers an alert?

Yes

715

Provide notification, relevant to the context, through the wearable device without launching an application on the wearable device

720

Receive user interaction with the notification

725

Determine whether to perform an action based on the user interaction

730

Perform the action without launching an application

Fig. 7

SYSTEM FOR CONTEXTUALLY DRIVEN, PERSONALIZED, IN-TIME UTILITY FOR WEARABLE ELECTRONIC DEVICES

CROSS-REFERENCE TO RELATED APPLICATIONS

The present application is a national phase entry under 35 U.S.C. § 371 of International Application No. PCT/US2021/063535, filed Dec. 15, 2021, which claims the benefit of the filing date of U.S. Provisional Application No. 63/232,371, filed Aug. 12, 2021, entitled "System For Contextually Driven, Personalized, In-Time Utility For Wearable Electronic Devices", the disclosures of which are hereby incorporated herein by reference.

BACKGROUND

While software applications, or "apps", are typically available on small form factor electronic devices, such as smartwatches or other wearable devices, users typically do not interact with the apps on the small form factor device. This may be because of the time it takes to figure out which app to use, find the app on the small form factor device, and launch the app. Users instead tend to interact with the app on a paired host device, such as a mobile phone, which can be easier for the user to manipulate.

SUMMARY

The present disclosure provides for using contextual information to display templated bits of information on a user electronic device, wherein the user can interact with the notification to perform an action, without launching an application.

One aspect of the disclosure provides a method for providing contextual alerts through a wearable device, comprising detecting, by one or more sensors on the wearable device, a context of a user, the context including conditions surrounding the wearable device, determining, by one or more processors on the wearable device, whether the detected context triggers an alert, and when the detected context triggers the alert, providing a notification through the wearable device without launching an application on the wearable device, wherein the notification is relevant to the context.

According to some examples, the method may further include receiving user interaction with the notification without launching an application on the wearable device, determining, based on the user interaction, whether to perform an action, and performing the action when it is determined to perform the action. Performing the action may include interfacing with a wirelessly paired device to perform the action.

According to some examples, providing the notification may include identifying a template corresponding to the alert from a plurality of templates stored on a wirelessly paired device. Performing the action may include pulling content from the wirelessly paired device based on the template. Pulling the content may include pulling the content from an application on the wirelessly paired device without launching the application.

According to some examples, determining whether the detected context triggers an alert may include executing an operating system level framework.

According to some examples, the method may further include providing a suggestion for updating alert settings for the alert.

According to some examples, the method may further include detecting a pattern of interaction with the alert, and automatically updating alert settings based on the detected pattern of interaction.

Another aspect of the disclosure provides a system for providing contextual alerts through a wearable device, comprising one or more sensors, and one or more processors in communication with the one or more sensors. The one or more processors may be configured to detect, using the one or more sensors, a context of a user, the context including conditions surrounding the wearable device, determine whether the detected context triggers an alert, and when the detected context triggers the alert, provide a notification through the wearable device without launching an application on the wearable device, wherein the notification is relevant to the context.

According to some examples, the one or more processors may be further configured to receive user interaction with the notification without launching an application on the wearable device, determine, based on the user interaction, whether to perform an action, and perform the action when it is determined to perform the action. Performing the action may include, for example, interfacing with a wirelessly paired device to perform the action.

According to some examples, providing the notification may include identifying a template corresponding to the alert from a plurality of templates stored on a wirelessly paired device. Performing the action may include pulling content from the wirelessly paired device based on the template. Pulling the content may include pulling the content from an application on the wirelessly paired device without launching the application.

According to some examples, the system may further include a display, wherein providing the notification comprises displaying a description and one or more response prompts through the display.

According to some examples, determining whether the detected context triggers an alert may include executing an operating system level framework.

According to some examples, the one or more processors may be further configured to determine a suggested update for alert settings for the alert.

According to some examples, the one or more processors may be further configured to detect a pattern of interaction with the alert, and automatically update alert settings based on the detected pattern of interaction.

Yet another aspect of the disclosure provides a non-transitory computer-readable medium storing instructions executable by one or more processors to perform a method for providing contextual alerts through a wearable device, comprising detecting, by one or more sensors on the wearable device, a context of a user, the context including conditions surrounding the wearable device, determining whether the detected context triggers an alert, and when the detected context triggers the alert, providing a notification through the wearable device without launching an application on the wearable device, wherein the notification is relevant to the context.

DRAWINGS

Figure 3C:
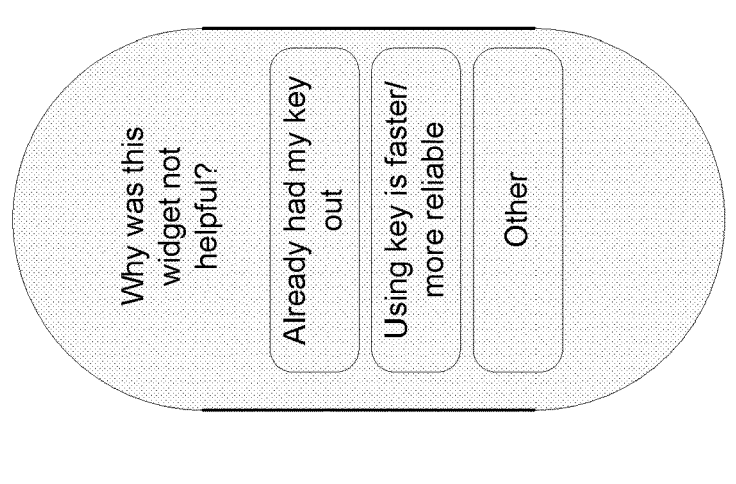
Figure 3B:
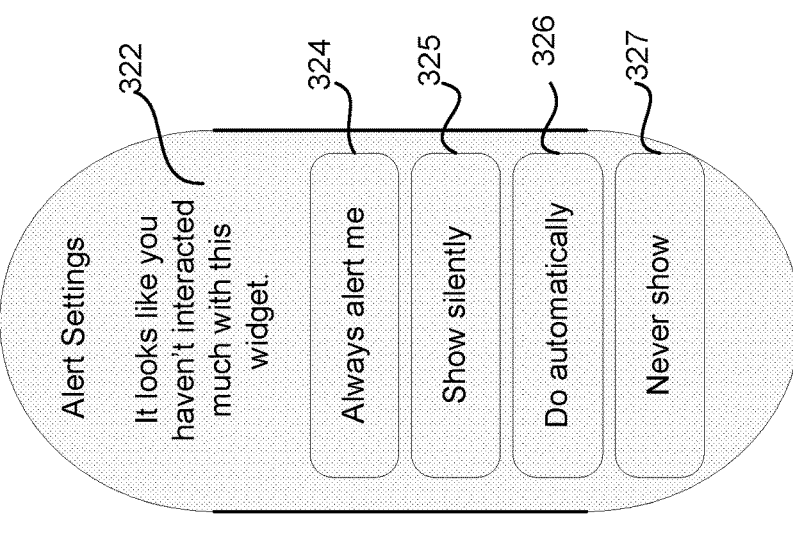
Figure 3A:
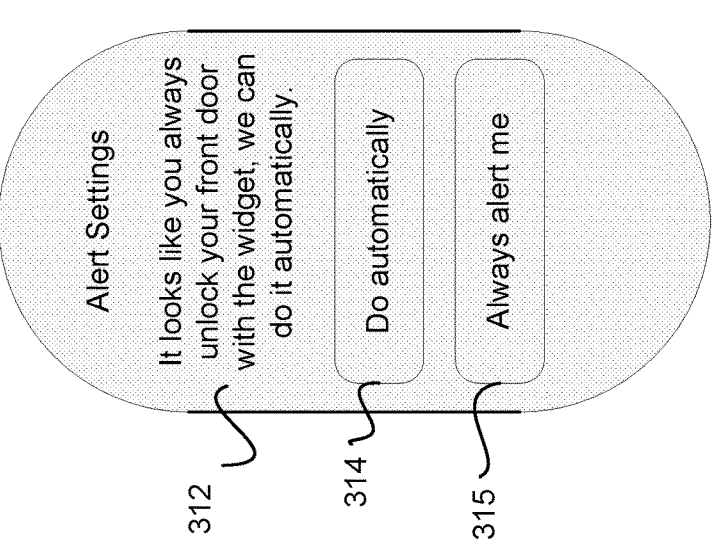

FIGS. 3A-C illustrate example actionable notifications according to aspects of the disclosure.

Figure 4:
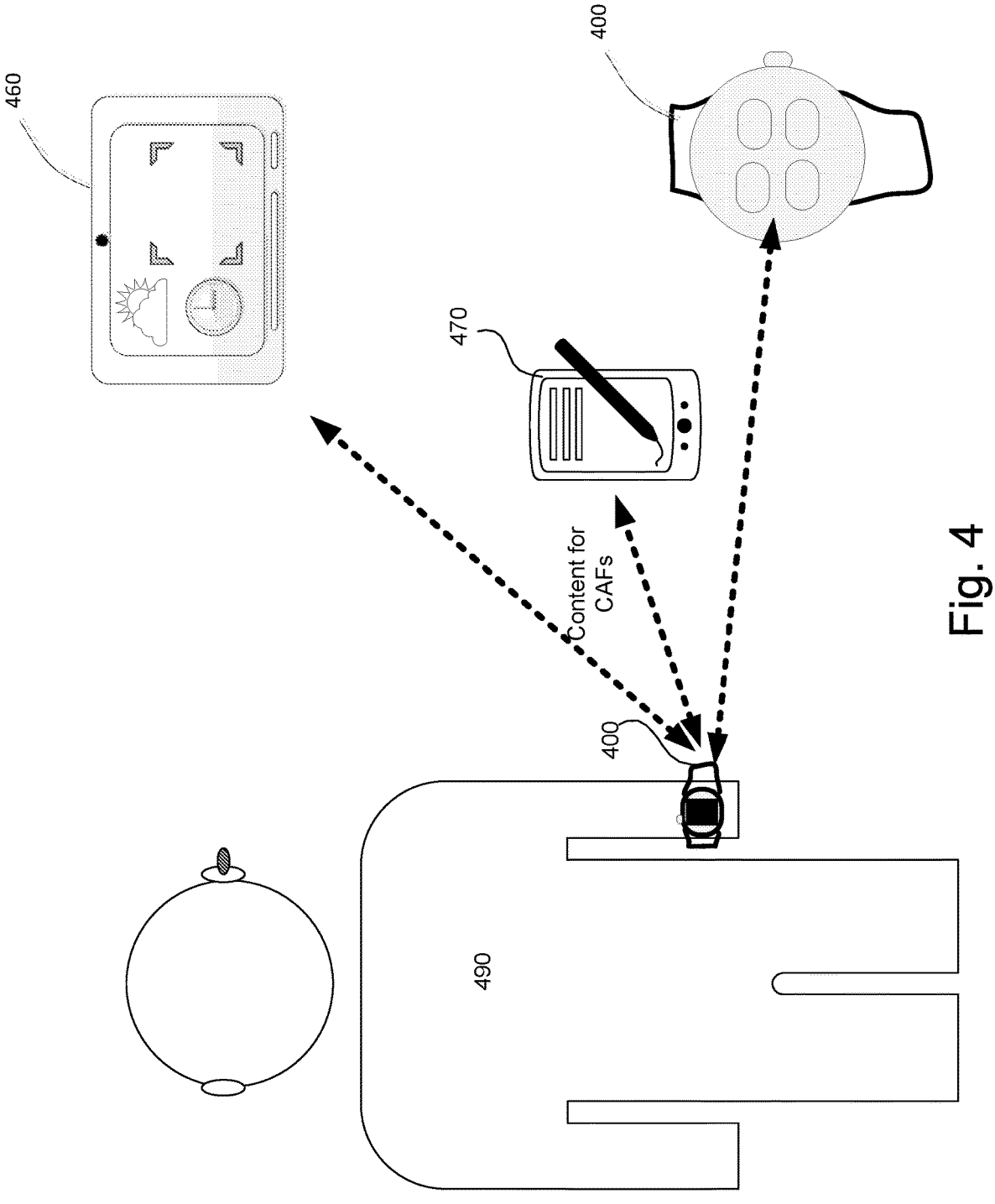

FIG. 4 is a pictorial diagram illustrating example sources of content for the contextual alerting function according to aspects of the disclosure.

Figure 5:
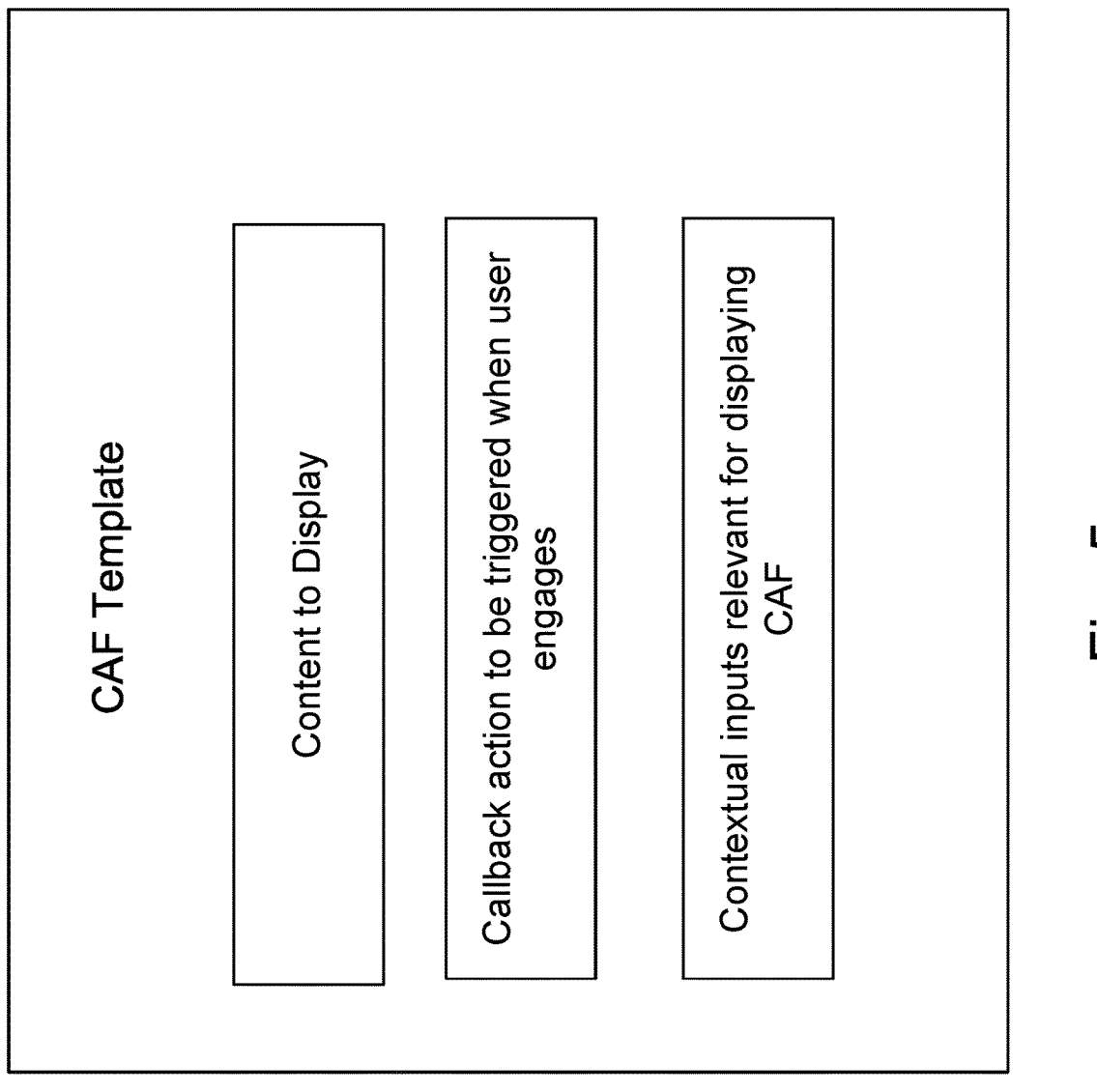

FIG. 5 is a block diagram illustrating an example template for a contextual alerting function according to aspects of the disclosure.

Figure 6:
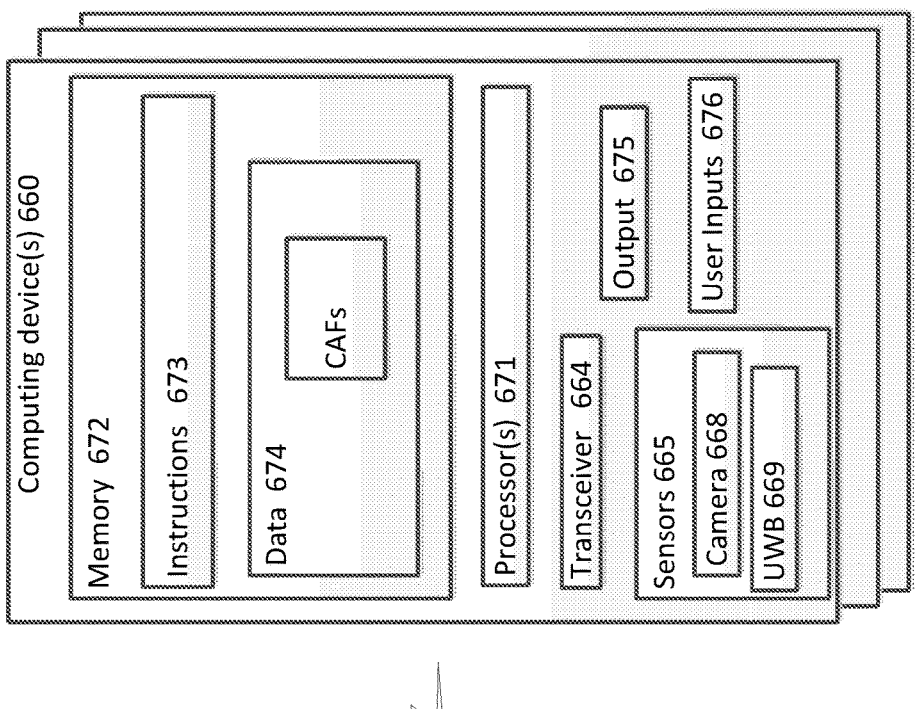
Figure 6:
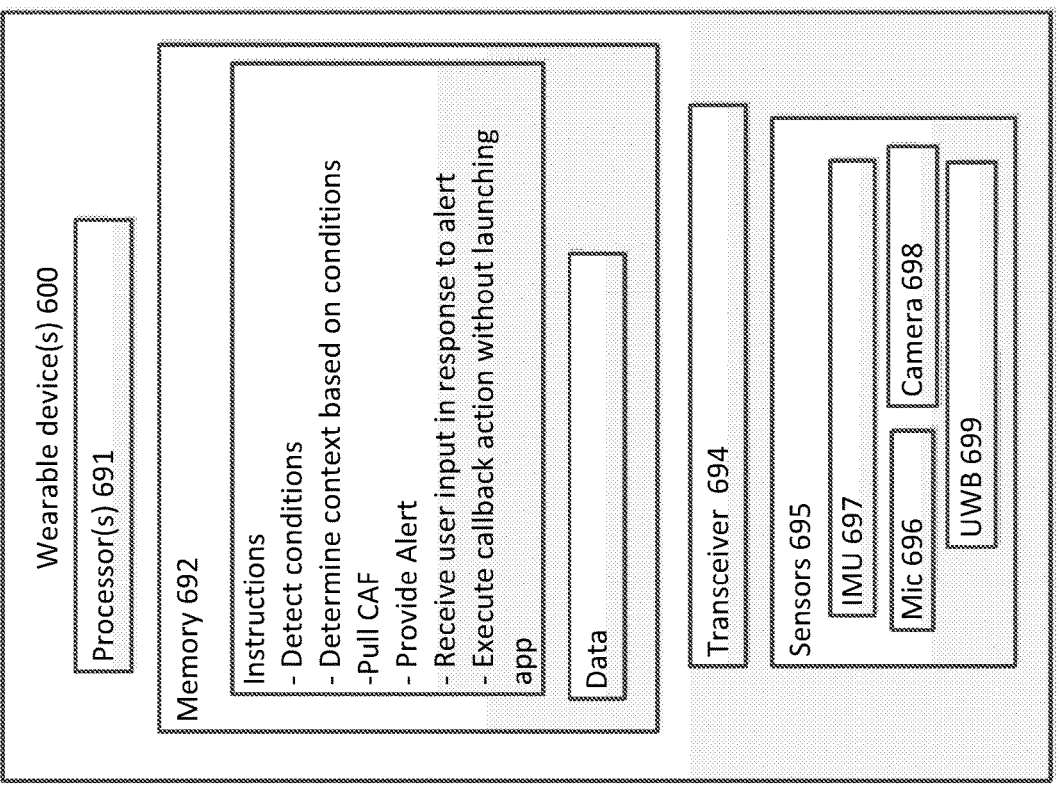

FIG. 6 is a block diagram illustrating an example system according to aspects of the disclosure.

FIG. 7 is a flow diagram illustrating an example method according to aspects of the disclosure.

DETAILED DESCRIPTION

The present disclosure provides for Contextual Alerting Functions (CAFs). CAFs are an interface paradigm for synchronized device frameworks across multi-device eco-systems and user data models. CAFs can replace existing concepts such as apps and/or notifications.

The CAF provides an interface to interact with an app present on a user's phone or watch, or with a smart assistant or other device. The CAF triggers one or more callback actions based on the user's input on the CAF. The CAF is displayed based on one or more contextual inputs such as a current location, nearby/proximate devices, time of day, state of nearby media devices (e.g. speakers, tv, etc.), the user's status (e.g. driving, sleeping, eating, etc.), and/or ongoing active services (e.g. rideshare, deliveries, etc.). The CAF is personalized for a user based on the user's usage pattern.

CAFs differ from apps in that they provide a single end-to-end user journey on one screen, are delivered in-time to the user with contextual cues, can be displayed with other CAFs simultaneously on the small screen, take a highly templated approach to improve efficient skimming of content, do not require the user to install anything on their small form factor device, and do not require extensive system libraries to be pulled in. While some operating system level libraries may be used to implement CAFs, third party developers are not needed. As a result, there is no need for developers to create specific apps for the small form factor device, there is no need for users to download specific apps to their small form factor device, users are able to accomplish tasks more quickly using CAFs as compared to using apps or notifications, users are able to complete user journeys with only one interaction, and users do not have to search for the right app to launch when they need help.

CAFs may have an alerting function that can be set manually, automatically, or suggested. The alerts provided through the CAFs may be displayed differently based on a type of alert. For example, urgent alerts may be displayed on a main portion of the display and overlaying other content, while contextually suggested CAFs may appear in a less obstructive portion of the display.

To build each CAF, developers select one of a small set of CAF templates and specify parameters such as: what content should be displayed in the template; what callback action(s), such as unlocking a door, should be triggered when the user engages with the user interface (UI) for the CAF; and which of the available contextual inputs are relevant for displaying this CAF, such as location, proximity to another device, time of day, user activity, etc.

Each CAF represents a single user journey. They are not mini-apps, they are quick, glanceable moments of interaction. One particular app might design multiple CAFs for specific situations, such as a CAF for starting a workout based on user activity, and another CAF for recording drinking a glass of water.

An operating system developer, CAF developer, device designer, other programmer, or the user may determine which of the available CAFs may be contextually relevant to the user at a given time, and at what importance level to display that CAF (e.g. whether to display over the watch-face). A high level system may rank CAFs to determine which CAF(s) should show up. For example, the system may leverage contextual cues, such as previous user behavior patterns of opening and using prior CAFs. In this example, the relevance factor for each suggested CAF may increase upon usage and decrease if the user dismisses it. User behavior patterns may further include time-of-day usage patterns, such as learning when a user typically starts a workout during the day. The contextual cues may further include, for example, current user location, nearby devices, time of day, state of nearby media devices (e.g. speakers, tv), user's status (e.g. driving, sleeping, eating), ongoing active services (e.g. rideshare, deliveries), etc. The system may also use federated learning to gather insights about the most relevant CAFs for specific contexts based on the interaction patterns of a variety of users.

Figure 1:
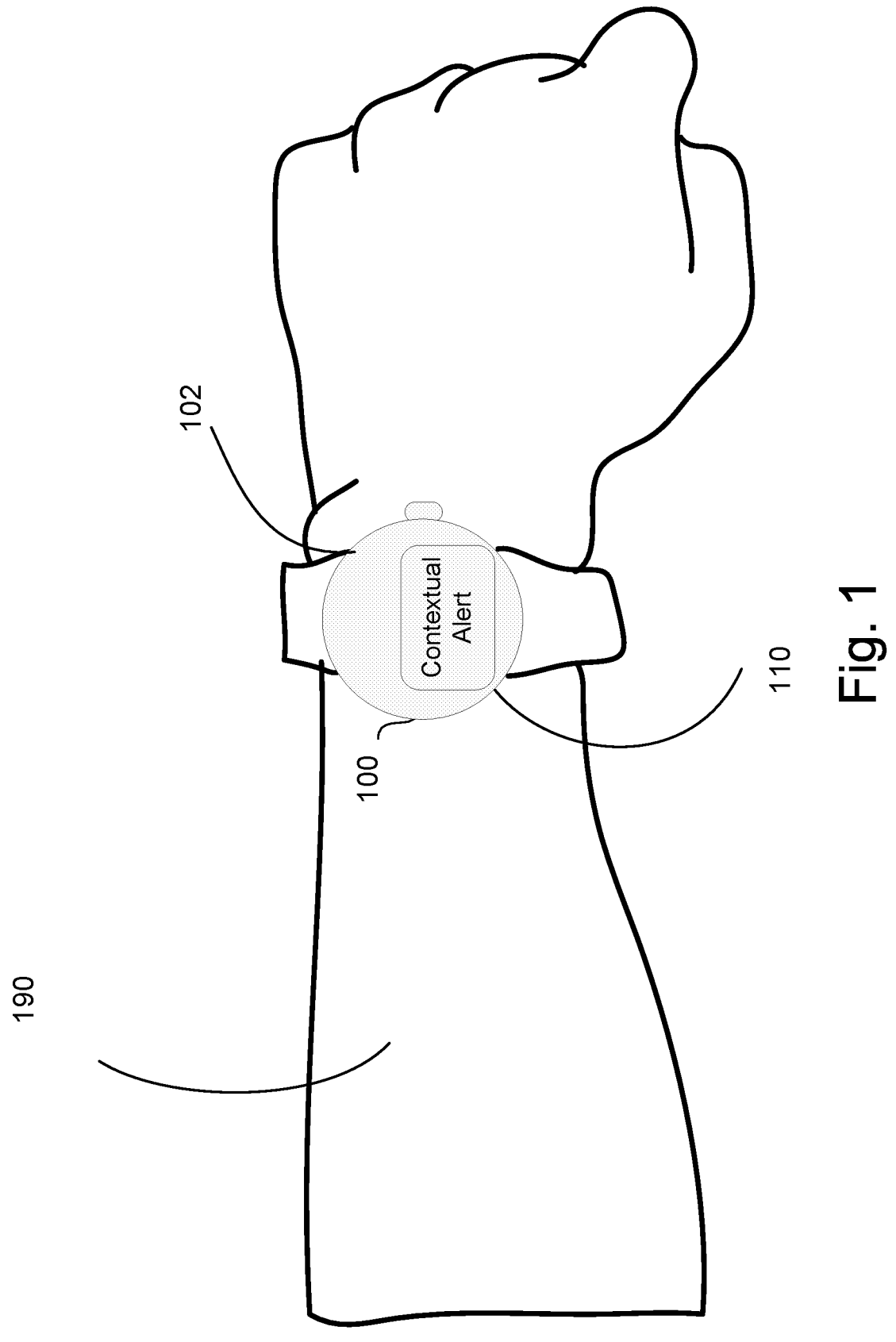
FIG. 1 is a pictorial diagram illustrating an example contextual alert on a wearable device according to aspects of the disclosure.

FIG. 1 is a pictorial diagram illustrating an example contextual alert 110 on a wearable device 100 worn by a user 190. For example, the wearable device 100 in this example includes a display 102. The contextual alert 110 appears as a graphic on the display 102. The contextual alert 110 may appear in response to detection, by the wearable device 100 or other devices wirelessly paired with the wearable device 100, of a particular context.

The context may include one or more conditions surrounding the user 190. Such conditions may include information stored in an account registered to the user 190, such as calendar entries, historical information, transactions such as orders for delivery, or any other type of information related to the user and for which the user has approved use with CAFs. Further examples of such conditions surrounding the user 190 include weather, other devices detected within a predetermined range, position, etc., user activity such as movements, interactions, etc., time of day, dates, seasons, etc.

While the contextual alert 110 is illustrated in FIG. 1 as a graphic on a display, in other examples the contextual alert 110 may take different forms, such as audible notifications, haptic feedback, etc. Moreover, as described further herein, appearance and positioning of the alert 110 may be determined based on a variety of factors, such as priority, type of notification, context, etc. While the wearable device 100 is shown in FIG. 1 as a smartwatch, any of a variety of wearable devices may be used to issue the alert. For example, such wearable devices may include smart glasses, helmets, earbuds, rings, pendants, smart clothing, fitness trackers, or any other device with a small form factor user interface.

Figure 2:
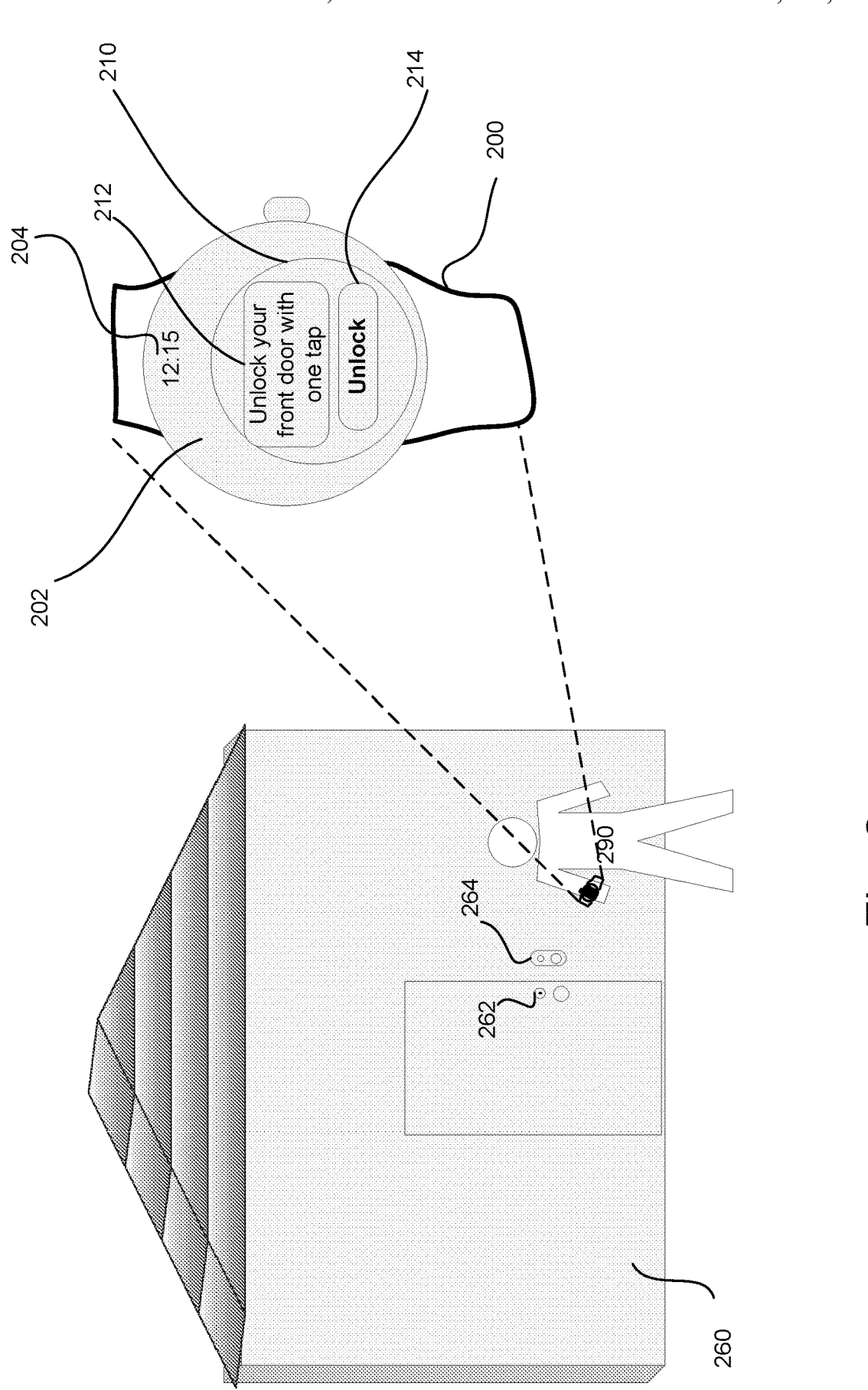
FIG. 2 is a pictorial diagram illustrating an example context and a relevant notification according to aspects of the disclosure.

FIG. 2 illustrates an example context and a relevant contextual alert. In this example, user 290 is wearing smartwatch 200 and walks up to the front door of the user's house 260. A proximity between the smartwatch 200 and a smart lock 262, video doorbell 264, and/or other device, such as a home assistant device within the house 260, may be detected. For example, the smartwatch 200 may be detected using short range wireless pairing technology, such as Bluetooth or ultra wide band (UWB), radiofrequency (RF) tags, image capture devices, or any other technology. Security identifiers associated with the smartwatch 200 and the smart lock 262 or other home device may be verified to confirm that the user 290 is authorized to access the house 260 using the smart lock 262.

In response to detecting the user's presence at the door and verifying authorized access, a CAF may be triggered and alert 210 may be presented on the user's smartwatch 200. By way of example only, the detected conditions may be compared to conditions listed in a library of CAF templates stored on the smartwatch 200 or on an associated device, such as a wirelessly paired phone, laptop, tablet, home assistant, or the like. According to some examples, multiple conditions may be detected and compared to stored information to determine the context. Some conditions may be categorized as necessary for a particular context, and others may be optional, such as to improve an accuracy of determining the context. In some examples, described in more detail below in connection with FIG. 5, the CAF template may specify which conditions are necessary and/or optional.

When the CAF is triggered by the detected conditions, the contextual alert 210 is provided on display 202 of the smartwatch 200. According to some examples, the alert 210 may occupy only a portion of the display 202, such that other information, such as time 204 by way of example only, can simultaneously be displayed. The alert 210 may include a description 212 or informational portion. In this example, the alert 210 further includes a user input prompt 214. For example, the description 212 informs the user 290 of an ability to unlock the door through the CAF. The prompt 214 provides the option for the user to enter the input, which in turn triggers an instruction to the smart lock 262 to unlock the door. While only one prompt 214 is shown in this example, it should be understood that in other examples additional prompts may be provided, such as to display different input options to the user.

While FIG. 2 illustrates one example context of approaching the front door of the user's house and a corresponding CAF alerting the user 290 of the option of unlocking the front door using the smartwatch 200, numerous other types of CAFs are possible and may correspond to a variety of different contexts. By way of example only: when it is detected that the user steps outside to look for a delivery driver for a food order the user placed, for example based on proximity sensors, GPS, transaction history, etc., the CAF may indicate to the user the driver's location and/or estimated arrival time; when the user wakes up, for example as detected by biometric sensors within the wearable device, the CAF may indicate how long the user slept, heart rate, waking intervals, or other related information; when the user exits an office building that the user routinely occupies during predetermined hours of the day, the CAF may suggest upcoming events stored in the user's calendar; when the user steps outside and begins jogging, as detected by motion sensors, GPS, etc., the CAF may suggest that the user record the distance covered, steps taken, calories burned, etc. during the jog.

While CAFs may be suggested to the user based on context, in some examples CAFs may be pinned by the user. For example, a user can pin it to a particular place on the wearable device, for example, as a small icon on watch face, or left/right swipe of the watch face, or somewhere else. In this regard, a user can easily find the CAF when needed. In some examples, the user may instruct the wearable device or another device wirelessly paired thereto to generate an alert.

The alert may remain on the display of the wearable device, such as on a portion of the main display, on a secondary display accessed by scrolling or the like, etc. The instructions to generate the alert may be provided through voice commands, graphical user interface of the wearable device, an interface of a paired device, etc.

According to some examples, CAFs may be ranked or other ascribed a priority of level of importance. The rank or priority may be determined based on, for example, a nature of the CAF or actions that may be prompted by the user's interaction with the CAF, user input, detected conditions such as timing, configuration of the CAF template, etc.

In some examples, the ranking of a given CAF may be adjusted based on the user's interactions with the CAF over time. For example, if the user dismisses the given CAF each time it is presented, the priority or rank of the CAF may be lowered. Conversely, if the user commonly engages a lower priority CAF, the priority of that CAF may be raised in future instances when context relevant to the CAF is detected.

In further examples, a rank or priority of CAFs may be used to determine placement of the CAFs on a display screen of the wearable device. For example, high priority or highly relevant CAFs may be presented over the main display screen, which lower priority CAFs may be presented underneath or in an unobtrusive portion of the display.

FIGS. 3A-C illustrate example alert setting that may be suggested using CAFs. For example, the settings updates may be suggested in response to recognizing a pattern of user interaction with the CAFs over time, such as when the user interacts with the CAF to perform an action, interacts with the CAF to dismiss the CAF, ignores the CAF, etc. The suggested updates can be offered after a first time the CAF is presented to the user, or after two or more CAFs are presented and handled similarly by the user.

FIG. 3A illustrates a suggestion for updating the alert settings that may be provided by the CAF described above in connection with FIG. 2. In this example, it may be determined that the user has interacted with the CAF to unlock the front door one or more times, and therefore the CAF may prompt the user to indicate how alerts should be provided in future instances where the same context is detected. For example, as shown the suggestion may include a description 312 asking whether to automatically unlock the front door when the context is detected, and one or more response prompts 314, 315 such as "Do automatically" or "Always alert me." According to some examples, a response prompt suggested for the user may be highlighted, such as by changing a color or outline or other appearance of the "Do automatically" response prompt 314 based on a determination that the user typically using the CAF to unlock the door and therefore is likely to select the "Do automatically" response prompt 314.

FIG. 3B illustrates a suggestion for updating the alert settings that may be provided by the CAF if, for example, a pattern of behavior is detected wherein the user does not interact with the CAF. Similar to FIG. 3A, a description 322 may be provided indicating that it has been detected that the user does not often interact with the CAF, along with one or more response prompts 324-327. Each response prompt 324-327 may trigger, if selected, a different update to the alert settings.

While FIGS. 3A-B illustrate example instances in which a suggestions to update alert settings may be provided, suggestions may be provided in connection with any action in addition or alternative to updating alert settings. Moreover, while the suggestions illustrated related to the context of the user positioned at the front door and the associated CAF triggered by such conditions, suggestions may be provided in connection with any type of CAF. While the suggestions illustrated include descriptions and one or more prompts, the format of the suggestions may take any form, including but not limited to varying the number of response prompts.

FIG. 3C illustrates an example request for user feedback regarding the CAF. Such feedback may be sought, for example, in response to a user declining to user the CAF, such as by dismissing the alert, ignoring the alert, updating alert settings such as to not be alerted in future instances, or the like. While these are merely some examples, feedback may be sought for any of a variety of reasons. According to some examples, such feedback may be used to automatically adjust alert settings.

FIG. 4 is a pictorial diagram illustrating example sources of content for the contextual alerting function. As shown, available CAFs can be pulled from any of a variety of sources, including but not limited to smart home devices 460, mobile phones 470, smartwatch 400, laptops, tablets, or other paired devices associated with user 490, or any combination of these. For example, content for the alert, response prompts, and actions taken in response thereto may be pulled from one or more applications on the user's phone 470 and/or watch 400.

An app can publish several CAFs, each CAFs may contain an action tile, a description of the action, call to action callback button(s), and potentially some graphics such as icons, a diagram etc. Also the app can specify a trigger condition of the CAFs. This information may follow some templates, and a developer can specify them in their app. When the trigger condition is met, the template information is pulled from the phone app, and shown on the wearable device.

FIG. 5 is a block diagram illustrating an example template for a contextual alerting function. To build each CAF, a developer may select from a set of templates and specify particular information. The selected template may dictate how the CAF is provided, such as whether to display graphics and an arrangement of particular graphics, whether to provide audible or other output, etc. The information specified by the developer within the template may include, for example, what content should be displayed, a callback action to be triggered when the user engages the CAF, contextual inputs relevant for displaying the CAF, etc. The content may include, for example, the description 212 and response prompt 214 such as mentioned above with respect to FIG. 2, any associated graphics, or other content. The callback action may include, for example, the actions triggered by a user's interaction with response prompts, such as to unlock a door, etc. The contextual inputs may include the conditions detected by one or more sensors of the wearable device in response to which the CAF is triggered. For example, the contextual inputs may include detected nearby devices, time of day, weather, light, motion, audio, or any combination of these or a variety of other conditions. The CAFs may be stored, for example, in a library on the user's phone, smartwatch, home assistant, or any other wearable device or device paired with the wearable.

FIG. 6 is a block diagram illustrating an example system including a wearable device 600 and one or more paired computing devices 660, such as a smartphone, home assistant, wearable electronic device, tablet, gaming system, or other computing device. The wearable device 600 is configured to detect one or more conditions indicating a particular context, and trigger a CAF relating to the context, pulling content for the CAF from the computing device 660.

The wearable device 600 includes various components, such as a processor 691, memory 692 including data and instructions, transceiver 694, sensors 695, and other components typically present in wearable wireless computing devices. The wearable device 600 may have all of the components normally used in connection with a wearable computing device such as a processor, memory (e.g., RAM and internal hard drives) storing data and instructions, user input, and output.

The wearable device 600 may also be equipped with short range wireless pairing technology, such as a Bluetooth transceiver, allowing for wireless coupling with other devices. For example, transceiver 694 may include an antenna, transmitter, and receiver that allows for wireless coupling with another device. The wireless coupling may be established using any of a variety of techniques, such as Bluetooth, Bluetooth low energy (BLE), ultra wide band (UWB), etc.

The sensors 695 may be capable of detecting the user's movements, and/or other parameters such as relative proximity to other devices, etc. The sensors may include, for example, IMU sensors 697, such as an accelerometer, gyroscope, etc. For example, the gyroscopes may detect inertial positions of the wearable device 600, while the accelerometers detect linear movements of the wearable device 600. Such sensors may detect direction, speed, and/or other parameters of the movements. The sensors may additionally or alternatively include any other type of sensors capable of detecting changes in received data, where such changes may be correlated with user movements. For example, the sensors may include a barometer, motion sensor, temperature sensor, a magnetometer, a pedometer, a global positioning system (GPS), proximity sensor, strain gauge, camera 698, microphone 696, UWB sensor 699, etc. The one or more sensors of each device may operate independently or in concert.

The proximity sensor or UWB sensor may be used to determine a relative position, such as angle and/or distance, between two or more devices. Such information may be used to detect a relative position of devices, and therefore detect a relative position of the user's body parts on which the wearable devices are worn.

The strain gauge may be positioned, for example, in the smartwatch such as in a main housing and/or in a band of the smartwatch. Thus, for example, as a user's arm tenses, such as when the user performs a fist-clenching gesture, the strain gauge may measure an amount of tension.

The IMU sensor 697 may generate a three-dimensional signal which provides information about the direction and speed of the sensor movement. Features may be extracted from the IMU signal to help determine whether arm or wrist movement is involved when the signal is collected.

While several example sensors 695 are described, it should be understood that any of a variety of sensors may be included in the wearable device 600 and adapted to detect various conditions. A few examples of other sensors include, without limitation, light sensors, GPS, RF sensors, electromagnetic field sensors, temperature sensors, biometric sensors, etc.

In response to detecting signals from the sensors 695, the processor 691 may be configured to execute instructions to determine a context based on the detected conditions, pull a CAF from the computing device 600, and provide an alert associated with the CAF, such as by displaying content on the wearable device 600 and/or providing audible or tactile notification. While content for the CAF may be pulled from applications on the wearable device 600 and/or the computing device 660, the alert may be provided without launching the application. In some examples, the instructions may be executed to receive user input in response to the alert, and to execute a callback action with launching an application.

The computing device 660 may include components similar to those described above with respect to the wearable device. For example, the computing device 660 may include a processor 671, memory 672, transceiver 664, and sensors 665. Such sensors may include, without limitation, one or more cameras 668 or other image capture devices, such as thermal recognition, etc., UWB sensor 669, and any of a variety of other types of sensors.

Input 676 and output 675 may be used to receive information from a user and provide information to the user. The input may include, for example, one or more touch sensitive inputs, a microphone, a camera, sensors, etc. Moreover, the input 676 may include an interface for receiving data from the wearable device 600 and/or other wearable devices or other computing devices. The output 675 may include, for example, a speaker, display, haptic feedback, etc.

The one or more processors 671 may be any conventional processors, such as commercially available microprocessors. Alternatively, the one or more processors may be a dedicated device such as an application specific integrated circuit (ASIC) or other hardware-based processor. Although FIG. 6 functionally illustrates the processor, memory, and other elements of the computing device 660 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of computing device 660. Accordingly, references to a processor or computing device will be understood to include references to a collection of processors or computing devices or memories that may or may not operate in parallel.

Memory 672 may store information that is accessible by the processors 671, including instructions 673 that may be executed by the processors 671, and data 674. The memory 672 may be of a type of memory operative to store information accessible by the processors 671, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 673 and data 674 are stored on different types of media.

Data 674 may include one or more CAFs, each CAF corresponding to a different context. Data 674 may be retrieved, stored or modified by processors 671 in accordance with the instructions 673. For instance, although the present disclosure is not limited by a particular data structure, the data 674 may be stored in computer registers, in a relational database as a table having a plurality of different fields and records, XML documents, or flat files. The data 674 may also be formatted in a computer-readable format such as, but not limited to, binary values, ASCII or Unicode. By further way of example only, the data 674 may be stored as bitmaps comprised of pixels that are stored in compressed or uncompressed, or various image formats (e.g., JPEG), vector-based formats (e.g., SVG) or computer instructions for drawing graphics. Moreover, the data 674 may comprise information sufficient to identify the relevant information, such as numbers, descriptive text, proprietary codes, pointers, references to data stored in other memories (including other network locations) or information that is used by a function to calculate the relevant data.

The instructions 673 may be executed to receive information from the wearable device and provide a particular CAF for presentation as an alert on the wearable device 600. For example, the computing device 660 may receive a request from the wearable device 600, wherein the request identifies a specific CAF. In other examples, the computing device 660 may receive information indicating a context or one or more detected conditions, and may determine which CAF should be provided in response.

While the processor 671 and memory 672 of the computing device 660 are described in detail, it should be understood that the processor 691 and memory 692 of the wearable device 600 may include similar structure, features, and functions.

FIG. 7 is a flow diagram illustrating an example method of contextual alerting. While the operations are described in a particular order, it should be understood that the order may be modified or operations may be performed in parallel. Operations may be performed by a same device or by multiple paired devices. Moreover, operations may be added or omitted.

In block 705, a context is detected based on conditions surrounding a wearable device. Such conditions may include conditions detected by sensors, such as position, nearby devices, weather, time of day, noise, light, etc. Additionally or alternatively, such conditions may include information related to the user, such as events stored in the user's calendar, places routinely visited by the user, etc. Access to such information may be defined by the user, such that the user may restrict or authorize access to any particular type or all information, and information is not accessed unless permitted by the user.

In block 710, it is determined whether the context triggers an alert. For example, it may be determined whether a CAF has been defined specifying input conditions that correspond to the detected conditions.

In block 715, a notification relevant to the context is provided through the wearable device when it is determined that an alert is triggered. The notification may be provided using information pulled from an application on the wearable device or a paired device, but without launching the application on the wearable device. The content may include, for example, a description of the alert, one or more response prompts, graphics, etc. If the detected context does not trigger an alert, the method may return to block 705 where it continues to detect conditions.

In block 720, user interaction with the notification is received. Such interaction may include, for example, selection of a response prompt through a touch screen interface, voice command, or other input. Other examples of interaction may include dismissing the alert, silencing the alert, etc.

In block 725, it is determined whether to perform an action based on the user interaction. For example, the action may include sending a signal to another device, such as a signal to manipulate a lock, turn a light on or off, record an event, communicate a message, or any other type of signal. According to other examples, the action may be executed within the wearable device. In block 730, the action may be performed without launching an application on the wearable device.

The foregoing systems and methods are beneficial in that the CAFs provide a single end-to-end user journey on one screen, are delivered in-time to the user with contextual cues, and can be displayed with other CAFs simultaneously on the small screen. The CAFs take a highly templated approach to improve efficient skimming of content, do not require the user to install anything on their small form factor device, and do not require extensive system libraries to be pulled in. As a result, there is no need for developers to create specific apps for the small form factor device, there is no need for users to download specific apps to their small form factor device, users are able to accomplish tasks more quickly using CAFs as compared to using apps or notifications, users are able to complete user journeys with only one interaction, and users do not have to search for the right app to launch when they need help.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for providing contextual alerts through a wearable device, comprising:

detecting, by one or more sensors on the wearable device, a context of a user, the context including external conditions surrounding the wearable device;

determining, by one or more processors on the wearable device, whether the detected context triggers an alert without a physical interaction between the wearable device and the user;

when the detected context triggers the alert, displaying a notification and a user prompt for a user interaction with external devices through the wearable device using templated information pulled from an application without launching the application on the wearable device, wherein the notification is relevant to the context; and receiving the user interaction with the notification without launching the application on the wearable device, wherein the templated information is adjustable using automatically generated suggestions based on a pattern of the user interaction.

2. The method of claim 1, further comprising:

determining, based on the user interaction, whether to perform an action; and performing the action when it is determined to perform the action.

3. The method of claim 2, wherein performing the action comprises interfacing with a wirelessly paired device to perform the action.

4. The method of claim 2, wherein providing the notification comprises identifying a template corresponding to the alert from a plurality of templates stored on a wirelessly paired device.

5. The method of claim 4, wherein performing the action comprises pulling content from the wirelessly paired device based on the template.

6. The method of claim 5, wherein pulling the content comprises pulling the content from an application on the wirelessly paired device without launching the application.

7. The method of claim 1, wherein determining whether the detected context triggers an alert comprises executing an operating system level framework.

8. The method of claim 1, further comprising providing a suggestion for updating alert settings for the alert.

9. The method of claim 1, further comprising:

detecting a pattern of interaction with the alert; and automatically updating alert settings based on the detected pattern of interaction.

10. A system for providing contextual alerts through a wearable device, comprising:

one or more sensors; and one or more processors in communication with the one or more sensors, the one or more processors configured to:

detect, using the one or more sensors, a context of a user, the context including external conditions surrounding the wearable device;

determine whether the detected context triggers an alert without a physical interaction between the wearable device and the user;

when the detected context triggers the alert, displaying a notification and a user prompt for a user interaction with external devices through the wearable device using templated information pulled from an application without launching the application on the wearable device, wherein the notification is relevant to the context; and receive the user interaction with the notification without launching the application on the wearable device, wherein the templated information is adjustable using automatically generated suggestions based on a pattern of the user interaction.

11. The system of claim 10, wherein the one or more processors are further configured to:

determine, based on the user interaction, whether to perform an action; and perform the action when it is determined to perform the action.

12. The system of claim 11, wherein performing the action comprises interfacing with a wirelessly paired device to perform the action.

13. The system of claim 11, wherein providing the notification comprises identifying a template corresponding to the alert from a plurality of templates stored on a wirelessly paired device.

14. The system of claim 13, wherein performing the action comprises pulling content from the wirelessly paired device based on the template.

15. The system of claim 14, wherein pulling the content comprises pulling the content from an application on the wirelessly paired device without launching the application.

16. The system of claim 10, further comprising a display, wherein providing the notification comprises displaying a description and one or more response prompts through the display.

17. The system of claim 10, wherein the one or more processors are configured to execute an operating system level framework to provide the notification.

18. The system of claim 10, wherein the one or more processors are further configured to determine a suggested update for alert settings for the alert.

19. The system of claim 10, wherein the one or more processors are further configured to:

detect a pattern of interaction with the alert; and automatically update alert settings based on the detected pattern of interaction.

20. A non-transitory computer-readable medium storing instructions executable by one or more processors to perform a method for providing contextual alerts through a wearable device, comprising:

detecting, by one or more sensors on the wearable device, a context of a user, the context including external conditions surrounding the wearable device;

determining whether the detected context triggers an alert without a physical interaction between the wearable device and the user;

when the detected context triggers the alert, displaying a notification and a user prompt for a user interaction with external devices through the wearable device using templated information pulled from an application without launching the application on the wearable device, wherein the notification is relevant to the context; and receiving the user interaction with the notification without launching the application on the wearable device, wherein the templated information is adjustable using automatically generated suggestions based on a pattern of the user interaction.

* * * * *